(12) United States Patent
Surawski

(10) Patent No.: US 11,046,449 B2
(45) Date of Patent: Jun. 29, 2021

(54) PRECOOLING FOR FUEL VAPORIZATION IN USE WITH CATALYTIC FUEL TANK INERTING

(71) Applicant: Hamilton Sundstrand Corporation, Charlotte, NC (US)

(72) Inventor: Eric Surawski, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 415 days.

(21) Appl. No.: 15/940,522

(22) Filed: Mar. 29, 2018

(65) Prior Publication Data

US 2019/0300196 A1    Oct. 3, 2019

(51) Int. Cl.
| | | |
|---|---|---|
| *B64D 37/34* | (2006.01) | |
| *B64D 37/32* | (2006.01) | |
| *B01D 53/22* | (2006.01) | |
| *F02C 6/08* | (2006.01) | |
| *F02M 27/02* | (2006.01) | |
| *B01D 53/00* | (2006.01) | |
| *B64D 13/06* | (2006.01) | |

(52) U.S. Cl.
CPC .............. *B64D 37/32* (2013.01); *B01D 53/00* (2013.01); *B01D 53/22* (2013.01); *B64D 37/34* (2013.01); *F02C 6/08* (2013.01); *F02M 27/02* (2013.01); *B64D 2013/0618* (2013.01); *B64D 2013/0659* (2013.01)

(58) Field of Classification Search
CPC .... F02C 7/22; B64D 37/34; B64D 2013/0659
See application file for complete search history.

(56) References Cited

U.S. PATENT DOCUMENTS

| | | | |
|---|---|---|---|
| 6,315,815 B1 * | 11/2001 | Spadaccini | ............ B01D 53/22 95/46 |
| 7,306,644 B2 | 12/2007 | Leigh et al. | |
| 7,694,916 B2 | 4/2010 | Limaye et al. | |
| 7,896,292 B2 | 3/2011 | Limaye et al. | |
| 7,905,259 B2 | 3/2011 | Johnson et al. | |
| 8,015,838 B2 | 9/2011 | Lippold et al. | |

(Continued)

FOREIGN PATENT DOCUMENTS

EP    3279092 A1    2/2018

OTHER PUBLICATIONS

Extended European Search Report for EP Application No. 19165221.3, dated Aug. 30, 2019, 5 pages.

*Primary Examiner* — Katheryn A Malatek
(74) *Attorney, Agent, or Firm* — Kinney & Lange, P.A.

(57) ABSTRACT

A gas inerting system for an aircraft includes a fuel tank configured to contain a liquid fuel, a fuel vaporization system in fluid communication with the fuel tank and configured to receive the liquid fuel from the fuel tank, a source of air in fluid communication with the fuel vaporization system and configured to deliver air into the liquid fuel to produce the fuel vapor, a heat exchanger in fluid communication with the source of air at a location upstream of the fuel vaporization system, and a catalytic oxidation unit in fluid communication with the fuel vaporization system. The heat exchanger is configured to cool the air from the air source. A fluid connection is configured to deliver the fuel vapor to the catalytic oxidation unit.

17 Claims, 2 Drawing Sheets

(56) References Cited

U.S. PATENT DOCUMENTS

| | | | |
|---|---|---|---|
| 2008/0128048 A1* | 6/2008 | Johnson | B64D 37/32 |
| | | | 141/59 |
| 2012/0087807 A1* | 4/2012 | Buchwald | B64D 37/24 |
| | | | 417/54 |
| 2016/0206995 A1 | 7/2016 | Rugg et al. | |
| 2017/0313435 A1 | 11/2017 | D'Orlando et al. | |
| 2017/0341019 A1 | 11/2017 | Rheaume et al. | |
| 2018/0016023 A1 | 1/2018 | D'Orlando et al. | |

\* cited by examiner

PRECOOLING FOR FUEL VAPORIZATION IN USE WITH CATALYTIC FUEL TANK INERTING

BACKGROUND

The present disclosure relates generally to air inerting systems for aircraft and other applications where an inert gas may be required and, more specifically, to air inerting systems using catalytic oxidation.

Aircraft fuel tanks can contain potentially combustible combinations of oxygen, fuel vapors, and ignition sources. Commercial aviation regulations require actively managing the risk of explosion in the vapor space (i.e., ullage) above the liquid fuel in fuel tanks. This can be accomplished by reducing the oxygen concentration in the ullage by displacing the air in the ullage with an inert gas containing less than 12% oxygen. Conventional fuel tank inerting (FTI) methods include air separation module (ASM) methods that utilize hollow fiber membranes to separate ambient air into nitrogen-enriched air, which is directed to fuel tanks, and oxygen-enriched air, which is usually rejected overboard. ASM methods rely on bleed air from a compressor stage of an engine, which is not always available in the desired quantity at sufficient pressure.

SUMMARY

A gas inerting system for an aircraft includes a fuel tank configured to contain a liquid fuel, a fuel vaporization system in fluid communication with the fuel tank and configured to receive the liquid fuel from the fuel tank, a source of air in fluid communication with the fuel vaporization system and configured to deliver air into the liquid fuel to produce the fuel vapor, a heat exchanger in fluid communication with the source of air at a location upstream of the fuel vaporization system, and a catalytic oxidation unit in fluid communication with the fuel vaporization system. The heat exchanger is configured to cool the air from the air source. A fluid connection is configured to deliver the fuel vapor to the catalytic oxidation unit.

A method for providing fuel vapor to a catalytic oxidation unit of a gas interting system includes cooling pressurized air, injecting the cooled pressurized air into a liquid fuel contained in a vessel, vaporizing a portion of the liquid fuel to produce a fuel vapor in a vapor space of the vessel, and delivering the fuel vapor to the catalytic oxidation unit.

The present summary is provided only by way of example, and not limitation. Other aspects of the present disclosure will be appreciated in view of the entirety of the present disclosure, including the entire text, claims and accompanying figures.

Figure 1:
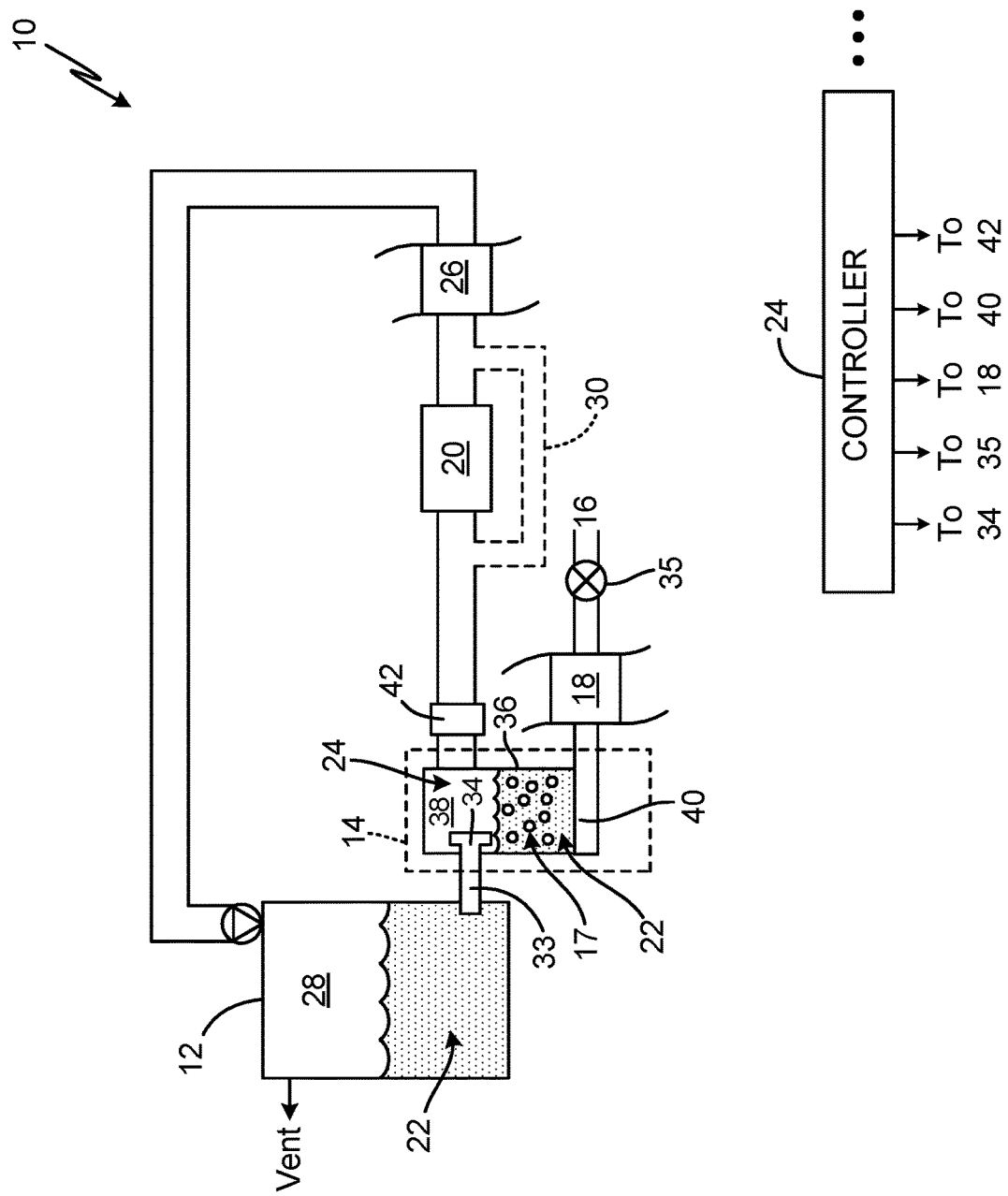
FIG. 1 is a schematic diagram of a gas inerting system using catalytic oxidation.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Catalytic oxidation of fuel is an alternative to traditional air separation modules (ASM) used to produce inert air onboard an aircraft for uses such as fuel tank inerting (FTI) and fire suppression. Catalytic oxidation of fuel can leverage a variety of incoming air sources, not limited to bleed air, to produce inert air with oxygen levels below the required 12% oxygen (or 9% for military engines) over a range of conditions. In catalytic oxidation, a catalyst is used to catalyze a chemical reaction between oxygen ($O_2$) and hydrocarbon fuel to produce carbon dioxide ($CO_2$) and water. Although liquid fuel is available on an aircraft, the fuel delivered to the catalyst for catalytic oxidation must be in a vapor phase. Air sparging can be used to volatilize a portion of liquid fuel to produce fuel vapors. Bleed air can be safely used as the sparge gas when the bleed air is cooled prior to sparging to reduce the risk of explosion.

FIG. 1 is a simplified schematic diagram of inert gas generating system 10, which can be present on-board an aircraft. Inert gas generating system 10 includes fuel tank 12, fuel vaporization system 14, air source 16 to deliver air 17, heat exchanger 18, and catalytic oxidation unit (COU) 20. Fuel vaporization system 14 is in fluid communication with fuel tank 12 and air source 16 and is configured to receive a portion of liquid fuel 22 from fuel tank 12 and air 17 from air source 16, which is introduced into liquid fuel 22 as a sparge gas to produce fuel vapor 24. Air 17 delivered to fuel vaporization system 14 can contain enough oxygen to support combustion. Therefore, to maintain safe conditions, the temperature of air 17 must be kept below the autoignition temperature of fuel 22. This can be achieved by passing air 17 through heat exchanger 18 to be cooled prior to entering fuel vaporization system 14.

Inert gas generating system 10 can produce a predominantly inert gas by mixing fuel vapor 24 from fuel vaporization system 14 and a source of oxygen, such as air from air source 16, in the presence of a catalyst (i.e., COU 20). Reaction of the hydrocarbon fuel and oxygen in the combustion air produces carbon dioxide and water vapor. The water vapor can be condensed from the exhaust gas exiting COU 20, for example, by heat exchanger 26. The carbon dioxide is an inert gas that is mixed with nitrogen naturally found in fresh/ambient air, and which flows through COU 20 unreacted. The inert gas and can be directed back to fuel tank 12 to displace gas in ullage 28 and/or can be directed to fire suppression systems (not shown). In some embodiments, a portion of the inert gas can be recycled back through COU 20 via recycle duct 30 (shown in phantom). The catalytic oxidation of fuel is an exothermic reaction, which produces a significant amount of heat. The recycle of inert gas can be used to dilute the reactants entering COU 20 as a means to manage the heat produced in COU 20. In alternative embodiments, heat can be removed from COU 20 via heat exchange with a cooling source. Controller 32 can be operatively coupled (e.g., electrically and/or communicatively) to components shown in FIG. 1 as well as components not depicted (e.g., valves, sensors, etc.) to control operation of inert gas generating system 10.

Liquid fuel 22 can be kerosene-based jet fuel, such as Jet-A, Jet-A1, or Jet-B fuel. For military applications, liquid fuel 22 can also be a jet propulsion "JP" class fuel, such as JP-5 or JP-8. Other types of fuel such as diesel, gasoline, and mixtures of fuels are also contemplated herein. Ullage space 28, which is a vapor space present above liquid fuel 22 in fuel tank 12, can contain potentially combustible fuel vapors. System 10 operates to reduce the risk of combustion and explosion within ullage space 28 by providing inert gas to maintain the oxygen concentration within ullage space 26 at or below 12% oxygen by volume for commercial aviation, and below 9% by volume for military applications.

A portion of liquid fuel 22 is extracted from fuel tank 12 and delivered to fuel vaporization system 14 via fuel delivery passage 33, connecting fuel tank 12 to fuel vaporization system 14. One or more valves 34 can be used to control delivery of liquid fuel 22 to fuel vaporization system 14. Fuel vaporization system 14 can be located in close proximity to fuel tank 12 or away from fuel tank 12.

Air source 16 can provide a pressurized source of ambient air, including, but not limited to bleed air from a compressor section of an engine. As referred to herein, the term "ambient" is used to indicate the chemical composition of air 17, not the pressure. Ambient air contains approximately 21% oxygen, which is sufficient for combustion. To remove the risk of combustion in fuel vaporization system 14, air 17 must be at a temperature below the autoignition temperature of the fuel. The autoignition temperature for most jet fuels is below 230 degree Celsius, but varies depending on fuel type. The flow of air 17 to fuel vaporizing system 14 can be controlled by one or more valves 35.

Heat exchanger 18 is located in fluid communication with air source 16 at a location upstream of fuel vaporization system 14 and is configured to cool air 17 to a temperature below the autoignition temperature of the fuel in fuel vaporization system 14. Heat exchanger 18 can be an air-to-air or liquid-to-air heat exchanger as known in the art, utilizing a cooling liquid or cooling air, such as ram air, fan bleed air, air exhausted from a cabin of the aircraft, or other sources capable of sufficiently reducing the temperature of air 17. The temperature of air 17 entering heat exchanger 18 can generally range from 80-260 degrees Celsius. Cooled air 17 exiting heat exchanger 18 is delivered to fuel vaporization system 14 as a sparge gas to release fuel vapor 24 from liquid fuel 22.

Fuel vaporization system 14 includes vessel 36, which is configured to contain liquid fuel 22, delivered from fuel tank 12. Vessel 36 includes vapor space 38, which fills the space above the liquid fuel 22. Valve 34 can be used to meter delivery of fuel 22, such that liquid fuel 22 does not exceed a defined maximum fill volume so as to ensure vapor space 38 remains available for collection of fuel vapor 24. Delivery of liquid fuel 22 can be controlled by controller 32. One or more sensors (not shown) may be used to detect a volume of liquid fuel 22 in fuel vaporization system 14. Fuel vapor 24 is produced by air sparging, in which air 17 is introduced into liquid fuel 22 as small bubbles. The small bubbles of air 17 cause a portion of liquid fuel 22 to volatilize and migrate to vapor space 38.

Air 17 is delivered through sparging element 40, which is located below the liquid fuel level. As shown in FIG. 1, sparging element 40 is located at a lowermost section of vessel 36, such that air bubbles 16 travel upwards through a full depth of liquid fuel 22. Sparging element 40 can be a frit, nozzle, or other mechanism as known in the art, capable of producing small bubbles of air 17 in liquid fuel 22. Air 17 delivered through sparging element 40 can be at a pressure between 8-60 psig. Sparging is a fast and effective method for producing fuel vapor 24 and can be conducted safely with air 17 provided the temperature of air 17 is kept below the autoignition temperature of the fuel. A mixture of air 17 and fuel vapor 24 collect in vapor space 38 and can be delivered to COU 20 for inerting.

COU 20 is fluidly connected to vapor space 38 to allow for delivery of fuel vapor 24 to COU 20. In some embodiments, a blower or pump 42 can be used to draw fuel vapor 24 from vapor space 38 and force fuel vapor 24 into an inlet of COU 20 for reaction. In some embodiments, additional combustion air (i.e., source of oxygen) can be mixed with fuel vapor and air 17 drawn from vapor space 38 to obtain the desired stoichiometric oxygen-to-fuel ratio for reaction in COU 20.

Fuel vaporization system 14 can be continuously operated or operated intermittently to provide on-demand fuel vapor 24 as necessary to meet inert gas needs. Controller 32 is used to control air 17 and liquid fuel 22 entering fuel vaporization system 14. Controller 32 can also be used to adjust flow of fuel vapor 24 from fuel vaporization system 14 to COU 20.

Figure 2:
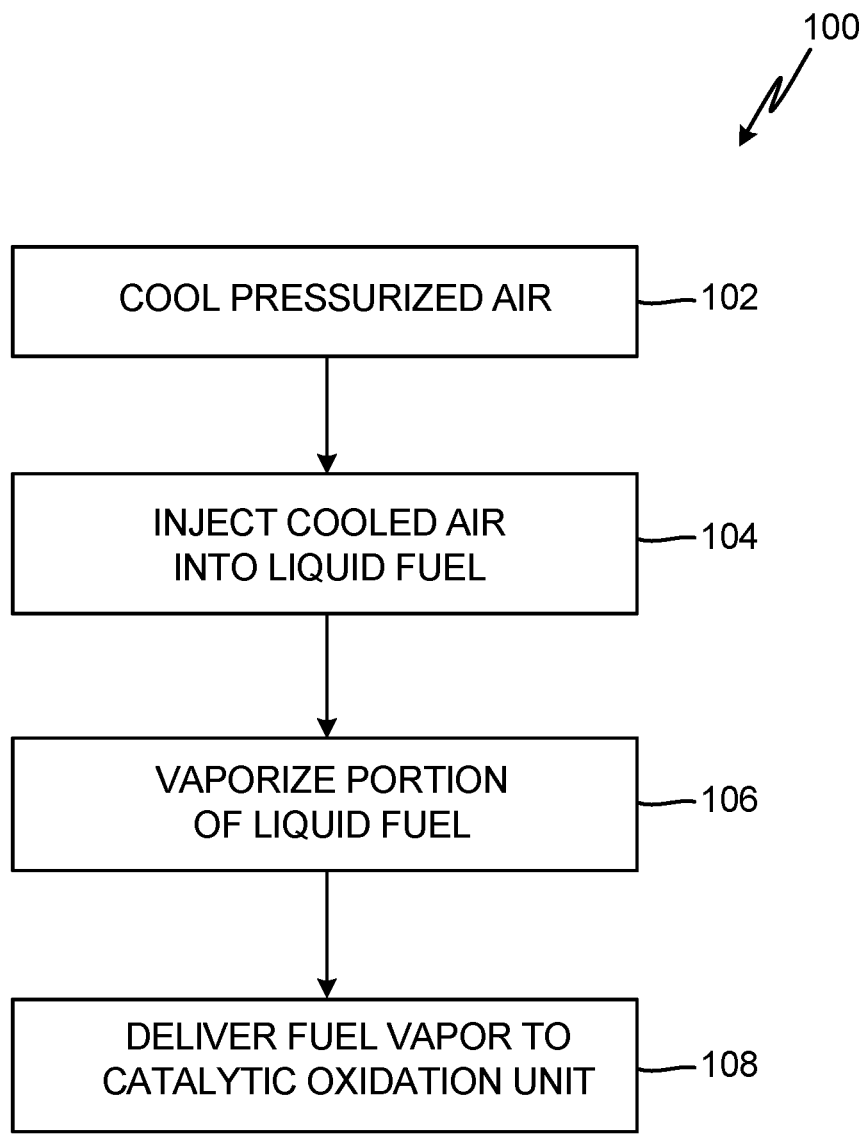
FIG. 2 is flow chart of a method for producing fuel vapor for gas inerting.

FIG. 2 provides a flow chart of method 100 for providing fuel vapor 24 to COU 20 for inerting. In method 100, pressurized air 17 is cooled through heat exchanger 18 to reduce the temperature of air 17 below an autoignition temperature of the fuel in fuel vaporizing system 14 (step 102). As previously discussed, heat exchanger 18 can be an air-to-air or liquid-to-air heat exchanger as known in the art. Air 17 can be pressurized ambient air, including but not limited to, bleed air from the compressor section of the engine. Cooled air 17 is directed from heat exchanger 18 to fuel vaporization system 14 for use as a sparge gas. Cooled air 17 is injected or passed into liquid fuel 22 in fuel vaporization system 14 as small bubbles (step 104). Cooled air 17 is injected into liquid fuel 22 from below the liquid fuel line, and preferably, near the lowermost portion of vessel 36 such that air bubbles 16 can migrate through a nearly full depth of liquid fuel 22. Cooled air 17 is injected into liquid fuel 22 with a sparging element, which can be a nozzle, frit, or other mechanism as known in the art capable of introducing small air bubbles 16 into liquid fuel 22. A portion of liquid fuel 22 is vaporized as air bubbles 16 migrate through liquid fuel 22, producing fuel vapor 24, which is released into vapor space 38 (step 106). Fuel vapor 24 that has collected in vapor space 38 is delivered to COU 20 for inerting (step 108).

Gas inerting systems using catalytic reactors can produce inert gas by reacting fuel vapor 24 and oxygen in the presence of a catalyst. Air sparging provides a fast and effective means for producing fuel vapor 24 from liquid fuel 22 and can be done safely with engine bleed air 17 containing oxygen if the temperature of air 17 is lowered below an autoignition temperature of the fuel.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A gas inerting system for an aircraft includes a fuel tank configured to contain a liquid fuel, a fuel vaporization system in fluid communication with the fuel tank and configured to receive the liquid fuel from the fuel tank, a source of air in fluid communication with the fuel vaporization system and configured to deliver air into the liquid fuel to produce the fuel vapor, a heat exchanger in fluid communication with the source of air at a location upstream of the fuel vaporization system, and a catalytic oxidation unit in fluid communication with the fuel vaporization system. The heat exchanger is configured to cool the air from the air source. A fluid connection is configured to deliver the fuel vapor to the catalytic oxidation unit.

The gas inerting system of the preceding paragraph can optionally include, additionally and/or alternatively, any one or more of the following features, configurations, and/or additional components:

The source of air can be disposed to provide a pressurized ambient air.

The source of air can be disposed to provide a bleed air from a section of the aircraft.

A fluid connection between the source of air and the fuel vaporization system can be located below a liquid fuel level.

The fluid connection can include a sparging element configured to deliver the air through the liquid fuel as bubbles and cause a portion of the liquid fuel to volatize to produce the fuel vapor.

The sparging element can include a frit.

The sparging element can include a nozzle.

The fuel vaporization system can include a vapor space.

The vapor space can be configured to contain the fuel vapor and the air that has passed through the liquid fuel.

The catalytic oxidation unit can be in fluid communication with the vapor space.

The heat exchanger can be configured to cool the air to a temperature below an autoignition temperature of the fuel.

A method for providing fuel vapor to a catalytic oxidation unit of a gas interting system includes cooling pressurized air, injecting the cooled pressurized air into a liquid fuel contained in a vessel, vaporizing a portion of the liquid fuel to produce a fuel vapor in a vapor space of the vessel, and delivering the fuel vapor to the catalytic oxidation unit.

The method of the preceding paragraph can optionally include, additionally and/or alternatively, any one or more of the following features, configurations, additional components, and/or steps:

The cooled pressurized air can be injected into the liquid fuel from a location in the vessel below a liquid fuel line.

The cooled pressurized air can be injected into the liquid fuel through a sparging element configured to deliver bubbles of the air into the liquid fuel.

The sparging element can include a nozzle or a frit.

The cooled pressurized air can be bleed air from a compressor section of an aircraft.

The cooled pressurized air can be cooled to a temperature below an autoignition temperature of the fuel.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas inerting system for an aircraft, the system comprising:
    a fuel tank configured to contain a liquid fuel;
    a fuel vaporization system in fluid communication with the fuel tank and configured to receive the liquid fuel from the fuel tank;
    a source of air in fluid communication with the fuel vaporization system and configured to deliver the air into the liquid fuel to produce a fuel vapor;
    a heat exchanger in fluid communication with the source of air at a location upstream of the fuel vaporization system, wherein the heat exchanger is configured to cool the air from the air source; and
    a catalytic oxidation unit in fluid communication with the fuel vaporization system, wherein a fluid connection is configured to deliver the fuel vapor to the catalytic oxidation unit.

2. The system of claim 1, wherein the source of air is disposed to provide a pressurized ambient air.

3. The system of claim 2, wherein the source of air is disposed to provide a bleed air from a section of the aircraft.

4. The system of claim 2, wherein a fluid connection between the source of air and the fuel vaporization system is located below a liquid fuel level.

5. The system of claim 4, wherein the fuel vaporization system comprises a sparging element configured to deliver the air through the liquid fuel as bubbles and cause a portion of the liquid fuel to volatize to produce the fuel vapor.

6. The system of claim 5, wherein the sparging element comprises a frit.

7. The system of claim 5, wherein the sparging element comprises a nozzle.

8. The system of claim 4, wherein the fuel vaporization system comprises a vapor space.

9. The system of claim 8, wherein the vapor space is configured to contain the fuel vapor and the air that has passed through the liquid fuel.

10. The system of claim 8, wherein the catalytic oxidation unit is in fluid communication with the vapor space.

11. The system of claim 2, wherein the heat exchanger is configured to cool the air to a temperature below an autoignition temperature of the liquid fuel.

12. A method for providing fuel vapor to a catalytic oxidation unit of a gas inerting system of an aircraft, the method comprising:
    delivering a liquid fuel from a fuel tank configured to contain the liquid fuel to a vessel of a fuel vaporization system, wherein the fuel vaporization system is in fluid communication with the fuel tank;
    cooling pressurized air with a heat exchanger in fluid communication with a source of air upstream of the fuel vaporization system;
    injecting the cooled pressurized air into the liquid fuel contained in the vessel;
    vaporizing a portion of the liquid fuel to produce a fuel vapor in a vapor space of the vessel; and delivering the fuel vapor to the catalytic oxidation unit, wherein the catalytic oxidation unit is in fluid communication with the fuel vaporization system and the fuel vapor is delivered through a fluid connection to the catalytic oxidation system.

13. The method of claim 12, wherein the pressurized air is injected into the liquid fuel from a location in the vessel below a liquid fuel line.

14. The method of claim 13, wherein the pressurized air is injected into the liquid fuel through a sparging element configured to deliver bubbles of the air into the liquid fuel.

15. The method of claim 14, wherein the sparging element comprises a nozzle or a frit.

16. The method of claim 12, wherein the pressurized air is bleed air from a compressor section of an aircraft.

17. The method of claim 12, wherein the pressurized air is cooled to a temperature below an autoignition temperature of the liquid fuel.

* * * * *